United States Patent
Simon et al.

(10) Patent No.: US 9,304,862 B2
(45) Date of Patent: Apr. 5, 2016

(54) METHOD OF HANDLING AN EMAIL MESSAGING CAMPAIGN

(71) Applicant: Emailvision Holdings Limited, London (GB)

(72) Inventors: Jean-Yves Simon, London (GB); Charles Wells, London (GB)

(73) Assignee: Smartfocus Holdings Limited (GB)

( * ) Notice: Subject to any disclaimer, the term of this patent is extended or adjusted under 35 U.S.C. 154(b) by 335 days.

(21) Appl. No.: 13/938,869

(22) Filed: Jul. 10, 2013

(65) Prior Publication Data

US 2015/0019910 A1    Jan. 15, 2015

(51) Int. Cl.
| | |
|---|---|
| *G06F 11/07* | (2006.01) |
| *G06F 11/14* | (2006.01) |
| *H04L 12/18* | (2006.01) |
| *H04L 12/58* | (2006.01) |

(52) U.S. Cl.
CPC ........ *G06F 11/1402* (2013.01); *H04L 12/1868* (2013.01); *H04L 51/34* (2013.01)

(58) Field of Classification Search
CPC .................................................. G06Q 10/107
USPC ............................................................ 714/16
See application file for complete search history.

(56) References Cited

U.S. PATENT DOCUMENTS

| | | | | |
|---|---|---|---|---|
| 7,536,439 | B1 * | 5/2009 | Jaladanki et al. | 709/206 |
| 2004/0250066 | A1 * | 12/2004 | Di Luoffo et al. | 713/168 |
| 2005/0010644 | A1 * | 1/2005 | Brown et al. | 709/206 |
| 2006/0075031 | A1 * | 4/2006 | Wagner et al. | 709/206 |
| 2007/0244974 | A1 | 10/2007 | Chasin | |
| 2007/0260692 | A1 * | 11/2007 | Burgoyne et al. | 709/206 |
| 2008/0278740 | A1 * | 11/2008 | Bird et al. | 358/1.15 |
| 2009/0083413 | A1 * | 3/2009 | Levow et al. | 709/224 |
| 2010/0287246 | A1 * | 11/2010 | Klos et al. | 709/206 |
| 2011/0137732 | A1 * | 6/2011 | Averbeck | 705/14.66 |
| 2011/0258217 | A1 * | 10/2011 | Hayes et al. | 707/769 |

(Continued)

FOREIGN PATENT DOCUMENTS

WO    2006119342 A2    11/2006

OTHER PUBLICATIONS

International Search Report for PCT/GB2014/052100, dated Jan. 15, 2015.

*Primary Examiner* — Chae Ko
(74) *Attorney, Agent, or Firm* — Rajesh Vallabh; Foley Hoag LLP

(57) ABSTRACT

A computer-implemented method of handling a current email messaging campaign to be broadcast to increase a deliverability parameter regarding a percentage of the campaign which has been successfully delivered is described. The email messaging campaign comprises a plurality of email messages with the same message content and a plurality of different email addresses to send the message content to. The method is implemented on a processor and comprises: receiving feedback data relating to a delivery error arising from a previous email messaging campaign previously broadcast to a plurality of recipients; categorizing the feedback data into one of a plurality of categories to identify a type of error; selecting one of a plurality of predetermined corrective actions based on the category of the feedback data determined in the categorizing step; and dynamically and automatically modifying the current outgoing email messaging campaign which has yet to be broadcast using the corrective action chosen in the selecting step.

33 Claims, 12 Drawing Sheets

(56) References Cited

U.S. PATENT DOCUMENTS

2011/0258218 A1* 10/2011 Hayes et al. .................. 707/769
2011/0289162 A1* 11/2011 Furlong et al. ................ 709/206
2013/0311282 A1* 11/2013 Cochrane et al. .......... 705/14.53
2014/0278922 A1* 9/2014 Wagner et al. ............. 705/14.44

* cited by examiner

| TYPE | GROUP | CATERGORY | LOGICAL GROUP | ACTIONS |
|---|---|---|---|---|
| Soft | Block | Spam-related relaying-issues policy-related content-related virus-related... | Blacklist ISP block Content block URL block Security virus Related Open related Authentication | No |
| Soft | Quota | Quota-issues inactive-mailbox... | Mailbox full Inactive/disable Account Greylist | Quarantine |
| Soft | Technical | Routing-errors no-answer-from-host bad-connection protocol-errors... | Server too busy Data format error Network error | No |
| Soft | Other | | Unknown erros | No |
| Hard | User unknown | Bad-mailbox... | Unknown user Address error Closed account | Quarantine |

FIG. 10

METHOD OF HANDLING AN EMAIL MESSAGING CAMPAIGN

FIELD OF THE INVENTION

The present invention relates to a method of and a system for handling an email messaging campaign to be broadcast to increase a deliverability parameter regarding a percentage of the campaign which has been successfully delivered. More particularly, though not exclusively, the system includes a novel architecture for an email distribution system which is used to distribute emails as part of a marketing campaign.

BACKGROUND TO THE INVENTION

When a user sends an email to a recipient using SMTP protocol, the email is sent through message transfer agents (MTAs, which are also known as SMTP servers), which are assigned by message exchange (MX) records (also known as MX servers). The MTAs and MX records are managed by entities known in this context as Internet Service Providers (ISPs). These technologies positioned between the sender (user) and the recipient check the validity of the email, and filter out the message in the event that it is determined to be suspicious or invalid. When this happens, the email is said to have "bounced". A bounce may be categorised as either a "hard bounce" or a "soft bounce". A "hard bounce" indicates a permanent error, for example the email address is incorrect or the domain name does not exist. A "soft bounce" indicates a temporary error, for example the recipient's inbox is full or the mail server is temporarily unavailable. A soft bounce can also indicate that the email has been rejected by the ISP because the user has a poor reputation, or because the email does not comply with their requirements.

All users build up a sender reputation over time as they send emails. This sender reputation is held by ISPs. When the ISPs handle emails originating from a particular user, the ISPs use the user's sender reputation to determine whether to forward email messages originating from the user to the intended recipients, or to reject (bounce) the emails. The sender reputation is primarily used by the ISPs in an effort to reduce the quantity of email spam messages which are delivered, where email spam is defined as emails containing advertisements which are sent indiscriminately to large volumes of recipients. In particular, ISPs try to prevent the delivery of emails which are generated automatically by programs such as spambots.

There are several factors which can influence sender reputation, some of the key factors including: (1) the volume of emails that a user sends, and in particular whether the volume is consistent; (2) the proportion of emails sent by the user which are addressed to unknown recipients, resulting in hard bounces; (3) the number of complaints against the user received by the ISP, in particular complaints that the messages sent by the user are spam; (4) spam trap hits, where spam traps are email accounts which are set up specifically to see whether they are sent advertising messages, in which case the messages must be spam by definition; (5) permanence, which is the length of time that a user has been actively sending emails; and (6) infrastructure, which applies to high-volume senders, in which case the ISPs check to see whether the user has the type of infrastructure in place that is required in order to handle large volumes of emails effectively.

In addition to the general sender reputation which is held by ISPs, each user also may have a recipient's sender reputation. Each ISP filters incoming email in order to provide the recipient with a cleaner and smaller inbox, which is optimised to include only email messages which are of genuine interest to the recipient, as far as possible. The ISPs use the recipient's interactions such as reporting spam, and managing a "junk mail" inbox, to tailor this process to the recipient's individual preferences. Therefore, if a user's emails are routinely sorted into a recipient's junk mail inbox, this indicates that the user's recipient sender reputation is poor. The ISPs can take recipient sender reputation into account in addition to the general sender reputation when determining whether to deliver a user's email messages. Additionally, if a user has a poor recipient sender reputation with a large number of recipients, this will affect the user's general sender reputation.

Historically, sender reputation has been linked to Internet Protocol (IP) addresses, which has the disadvantage that if several users are using the same IP address to send email, for example if they are using a common email server or email service provider (ESP), their sender reputations are linked to each other. More recently, there has been a shift towards domain based sender reputations, where the sender reputation is linked to the domain name rather than the IP address, meaning that the reputation is more closely tied to the actual user.

Email deliverability, which is a measure of the proportion of emails which are expected to bounce, is a well-known concept in the art. Deliverability is a key concern for marketing companies as it is important for marketers to minimise the proportion of emails which are not successfully delivered. Marketers often send carefully constructed email campaigns which typically contain over 100,000 emails, and often up to a million emails. Several such campaigns may be sent every month, with the campaigns targeted to selected customers. The emails sent are tailored to the group of people who will be receiving them, in order to maximise the effectiveness of the campaign. Therefore, if the emails sent as part of the campaign are not successfully delivered, that represents a significant wasted effort on the part of the user, with the associated cost implications.

Sender reputation is a significant factor in email deliverability, as a poor reputation leads to poor deliverability. If a user has a poor reputation, an ISP may limit how many emails they will deliver for that user in a given time period, or they may block emails from that user altogether. Therefore, it is important to build and maintain a good sender reputation as far as possible.

In addition to sender reputation, there are other factors which affect email deliverability. The first of these is the quality of the information which is available to the marketers for configuring their campaigns; in particular, whether a reasonable proportion of the list of email addresses that the marketers use is valid. Additionally, each ISP has an individual set of requirements that incoming emails from a user have to meet. These requirements include such things as the user maintaining a consistent IP address, including a clear way for recipients to opt out of receiving future email messages from the user, and the formatting of the email. If a user does not configure their email campaign correctly, their email deliverability rate will be low. A typical campaign involves sending billions of emails internationally every month, which may be handled by over 150 different ISPs. Therefore, configuring the campaign to take into account the varying requirements of each ISP and to avoid hard bounces is a complex and demanding task.

It is known in the state of the art to implement strategies for reducing the proportion of emails which are rejected and improve email deliverability by using a process known as bounce management. The strategies incorporated into bounce management systems include reducing the numbers of hard bounces by identifying and removing incorrect addresses, and improving sender reputation by attempting to address some of the contributing factors. However, given the large number of addresses from which a user makes a selection to direct their email campaigns to, removing incorrect addresses can be a time-consuming and laborious process.

When an email message is bounced by an ISP, the user is sent an SMTP bounce message containing details of the bounce. A typical bounce message which a user may receive from an ISP contains information such as: (1) the date of the bounced email; (2) the delivery status notification (DSN) code, which specifies the category of bounce according to recognised standards RFC821 or RFC1893; (3) an SMTP message containing an explanation of the cause of non-delivery of the email; (4) information regarding the MTA which bounced the email; and (5) the email message header and/or message body. One particular problem in handling bounces is that not all ISPs adhere to the recognised standard, and often an incorrect diagnostic code is applied. This makes it difficult to identify the precise cause of the bounce in order to prevent future bounces, and sometimes results in bounce management systems rejecting valid email addresses, or retaining invalid addresses.

Against this background, in order to provide an improved level of deliverability, it is desirable to provide an architecture for sending high volumes of emails which overcomes or substantially alleviates some of the above described problems in the state of the art.

SUMMARY OF THE INVENTION

It is one object of the present invention to provide an improved method of and a system for handling an email messaging campaign to be broadcast which overcomes or alleviates the aforementioned disadvantages known in the prior art. Preferably the method and system are arranged to increase a deliverability parameter regarding a percentage of the campaign which has been successfully delivered.

More specifically, according to one aspect of the present invention there is provided a computer-implemented method of handling a current email messaging campaign to be broadcast to increase a deliverability parameter regarding a percentage of the campaign which has been successfully delivered, the email messaging campaign comprising a plurality of email messages with the same message content and a plurality of different email addresses to send the message content to, the method being implemented on a processor and comprising: receiving feedback data relating to a delivery error arising from a previous email messaging campaign previously broadcast to a plurality of recipients; categorising the feedback data into one of a plurality of categories to identify a type of error; selecting one of a plurality of predetermined corrective actions based on the category of the feedback data determined in the categorising step; and dynamically and automatically modifying the current outgoing email messaging campaign which has yet to be broadcast using the corrective action chosen in the selecting step.

The provision and categorisation of the feedback from previous email messaging campaigns enables the modification of the current email messaging campaign helps to increase the value of the deliverability parameter (which concerns a percentage of the campaign which has been successfully delivered).

The present invention also extends to an email campaign system for handling a current email messaging campaign to be broadcast to increase a deliverability parameter regarding a percentage of the campaign which has been successfully delivered, the email messaging campaign comprising a plurality of email messages with the same message content and a plurality of different email addresses to send the message content to, the system comprising a plurality of processors for: receiving feedback data relating to a delivery error arising from a previous email messaging campaign previously broadcast to a plurality of recipients; categorising the feedback data into one of a plurality of categories to identify a type of error; selecting one of a plurality of predetermined corrective actions based on the category of the feedback data determined the plurality of processors carrying out the categorising step; and dynamically and automatically modifying the current outgoing email messaging campaign which has yet to be broadcast using the corrective action chosen by the plurality of processors in the selecting step.

According to another aspect of the present invention there is provided a computer-implemented method of improving a delivery performance indicator for a broadcast email campaign of a first user, the method comprising: providing a pooled group comprising a plurality of user identities, the pooled group having an associated IP (internet protocol) address and an associated group deliverability performance indicator for broadcast email campaigns sent by the users which have their identity provided in the pooled group; adding a first user identity to the pooled group, the first user having an associated first delivery performance indicator which is worse than the group delivery performance indicator; determining a sender identity of an email campaign to be broadcast; comparing the sender identity with user identities in the pooled group; and if the sender identity matches a user identity in the pooled group, substituting a sender email address with the IP address for the pooled group for the email campaign and sending the email campaign, such that the group delivery performance indicator associated with the IP address is inherited by the first user for the email campaign.

The present invention also extends to a system for improving a delivery performance indicator for a broadcast email campaign of a first user, the system comprising: a data store for retaining a pooled group of a plurality of user identities, the pooled group having an associated IP (internet protocol) address and an associated group deliverability performance indicator for broadcast email campaigns sent by the users which have their identity provided in the pooled group; a processor being configured to: add a first user identity of a first user to the pooled group, the first user having an associated first delivery performance indicator which is worse than the group delivery performance indicator; determine a sender identity of an email campaign to be broadcast; compare the sender identity with user identities in the pooled group; and if the sender identity matches a user identity in the pooled group, the processor acts to substitute a sender email address with the IP address for the pooled group for the email campaign and send the email campaign, such that the group delivery performance indicator associated with the IP address is inherited by the first user for the email campaign.

BRIEF DESCRIPTION OF THE DRAWINGS

In order that the invention may be more readily understood, preferred non-limiting embodiments thereof will now be described with reference to the accompanying drawings, in which:

FIG. 10 is a table showing an example of bounce error categorisations which may be entered into the report database table in FIG. 3.

DETAILED DESCRIPTION OF EMBODIMENTS OF THE INVENTION

Figure 1:
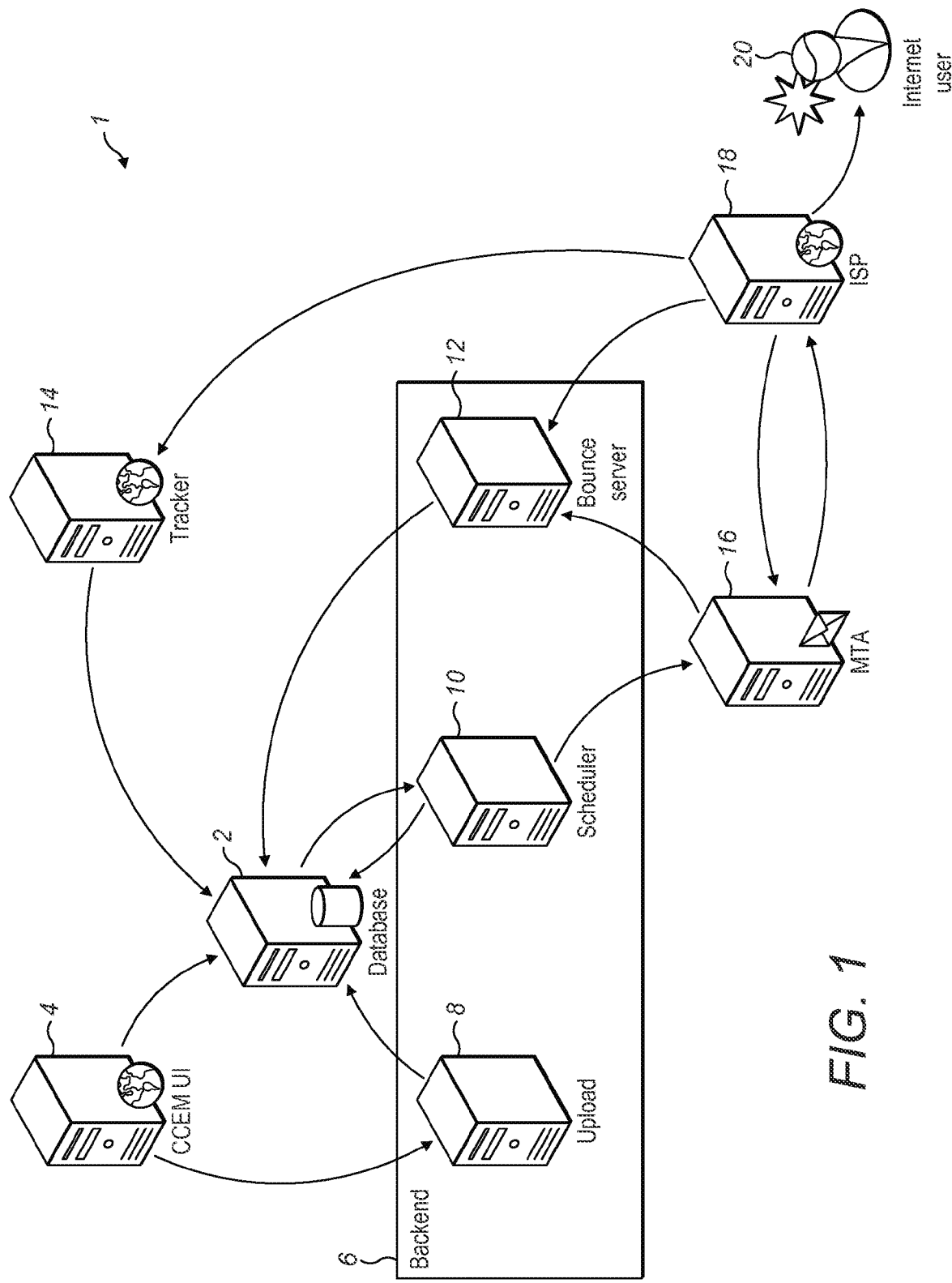
FIG. 1 is a schematic drawing showing the overall architecture of the email distribution system according to the present embodiment.

With reference to FIG. 1, an email distribution system 1 according to an embodiment of the invention is illustrated. The email distribution system 1 comprises a database 2 and a user interface (UI) 4, each of which communicate with a backend layer 6. The backend layer contains an upload module 8, a scheduler module 10 and a bounce server 12. The database 2 further communicates with a tracker server 14. The components of the backend layer 6 in turn communicate with a mail transfer agent (MTA) 16. For most communications the MTA 16 acts as an intermediary between the system 1 and MX servers belonging to internet service providers (ISPs) 18, although, as shown in FIG. 1, some communications are sent directly from the ISP 18 to the bounce server 12. The ISPs 18 communicate with internet users, hereafter referred to as recipients 20, who are the target recipients of emails sent by a user through the system 1. The backend 6, and in particular the bounce server 12, can also communicate directly with the ISPs 18.

The components of the backend 6 represent the majority of the processing power and intelligence within the email distribution system 1. The backend 6 acts as an interface between a user of the system 1, and external devices which are accessed, for example, via the internet. Therefore, the recipients 20 and the ISPs 18 are prevented from accessing the database 2 or the UI 4 directly. In this way, the system 1 takes the form of a three-tier architecture such as is well-known in the art, with the backend 6 representing the "application tier" or "business tier".

The user interacts with the UI 4 to configure new email campaigns according to their requirements. Campaign data is stored in and retrieved from tables which are contained in the database 2. The tables are described in more detail later with reference to FIG. 3. Each user has a set of tables stored in the database 2 which are specific to them, containing data that the user requires when configuring new email campaigns. In particular, a complete record of all of a user's potential target recipients 20, referred to hereafter as a member list, is held in the database 2. When configuring a new campaign, the user may choose to operate the UI 4 to define a selection of target recipients from the full member list. Alternatively, the new campaign can be configured to include the user's entire member list. Additionally, the user can enter new data which is specific to the new campaign using the UI 4, for example the contents of the email which is to be sent.

The components of the backend 6 cooperate to implement the configurations for new email campaigns, send out the email campaigns, and record multiple performance indicators for the campaigns, in particular the performance indicator of "deliverability".

The user can use the UI 4 to input all of the parameters and data which are required to define an email campaign. This data includes a message (including attachments) to be sent to recipients 20, and the list of recipients 20 for that specific campaign. Less complex campaign configuration data, for example a message to be contained in the emails which are sent out as part of a campaign, may be written to the database 2 directly by the UI 4.

The upload module 8 is provided to write more complex data relating to the email campaigns to the database 2, for example the details of all of the user's potential target recipients 20. As a client may have millions of potential target recipients 20, the upload module 8 is provided as a dedicated module to handle the large amount of data involved. Furthermore, by providing the upload module 8, the task of uploading the large amount of target recipient data may be handled asynchronously, so as to reduce the impact on concurrent processes. This means that these concurrent processes are not required to wait for the upload to finish before progressing onto the next task. The process of uploading data is described in more detail later with reference to FIG. 5.

The scheduler module 10 is a dedicated module which is used to send out email campaigns which have previously been configured and stored in the database 2. The scheduler module 10 is arranged to extract all of the required data from the database 2, and then to use that data to construct and broadcast the email campaign via the MTA 16. Once the scheduler module 10 has sent out a campaign, it updates a status report in the database 2 to record the details of the campaign which has been sent. The process of constructing, broadcasting and recording a new email campaign is described in further detail later with reference to FIG. 6. The term 'broadcast' is to be considered to mean transmitting the email messages of the messaging campaign via an email transport mechanism.

When an email campaign is broadcast, a report is compiled to record key information relating to the campaign, including the time the campaign was started, how many emails were bounced, and how many emails were read by recipients 20. The scheduler module 10 can use the contents of these reports to adjust an outgoing campaign in order to improve the performance indicator of "deliverability". In particular, the reports for previous campaigns contain information relating to emails which were not delivered correctly, or emails which had complaints raised against them by recipients 20, as explained later. The scheduler module 10 is arranged to use this data to automatically take the causes of previous errors or complaints into account when constructing a new campaign. In this way, the email distribution system 1 is provided with a form of feedback control which dynamically adjusts outgoing email campaigns according to the performance of previous campaigns, to take into account factors which affect sender reputation, in order to optimise deliverability.

Furthermore, the email distribution system 1 may be arranged to output an alert for certain types of bounce errors or complaints. This alert may be used by an operator to intervene in a campaign which is currently being broadcast to prevent further errors.

The bounce server 12 is provided to receive and process data returning from the MTA 16 or the ISPs 18 relating to emails which have bounced. In this way, the bounce server 12 acts as a feedback module. It is noted that bounces may be returned either synchronously or asynchronously; synchronous bounces are returned by the ISPs 18 almost immediately, whereas asynchronous bounces are returned after an unspecified period, which can range from a few minutes to months later. In this embodiment, synchronous bounces are initially handled by the MTA 16, whereas asynchronous bounces are handled directly by the bounce server 12. For this arrangement, the ISPs 18 use the sender details contained in the emails to return them directly to the bounce server 12. However, in an alternative embodiment the system may be arranged to direct all bounces to the MTA 16 for initial processing before forwarding on to the bounce server 12.

As mentioned previously, there are several reasons why an email might bounce. At the top level, bounces are categorised as either "hard" or "soft". Hard bounces simply relate to an incorrect address, however, within the "soft" category there are a number of reasons why the email may have bounced, as described previously. For synchronous bounces, the MTA 16 performs some initial processing on the error messages which includes categorising the bounce as hard or soft. The results are then forwarded to the bounce server 12. In this embodiment the bounce server 12 performs all processing for asynchronous bounces.

In addition to bounce messages, the bounce server 12 is also configured to receive and handle messages from ISPs 18 which relate to complaints. These complaint messages are primarily the result of recipients 20 filtering out the email which they receive by moving it into their "junk" inbox or equivalent. The ISPs 18 detect when recipients designate email messages as junk, and this information is used to build up a recipient sender reputation for that user, as described previously. The ISP 18 forwards a message back to the user to indicate that there was a complaint, which is received and processed by the bounce server 12. Complaint messages are processed in a similar way to bounce error messages, as the complaint messages are also significant in determining how to configure future email campaigns. In particular, future campaigns are configured so as to avoid a recurrence of the complaint, which would be detrimental to the user's "recipient sender reputation". This additional functionality therefore enhances the ability of the email distribution system 1 to improve email deliverability.

The process for managing bounce error messages is described more fully later with reference to FIGS. 4 and 7.

Once a new email campaign has been sent out, the tracker server 14 is able to detect some of the outcomes for emails which have been sent. In particular, when an email is successfully delivered and opened by a recipient 20, the tracker server 14 receives data from the ISPs 18 to indicate this fact, and also whether recipients 20 have taken any further action, for example clicking a link contained in the email. The tracker server 14 collates this data and records it in the database 2. This data can then be used by the user to determine certain performance indicators for the email campaign, which may be instructive when formulating future campaigns. The process of tracking an email campaign is described more fully later with reference to FIG. 8.

The MTA 16 is a third-party platform which is used for sending and receiving email messages, along with various other standard processing functions. In this embodiment, the MTA 16 is configured to apply the user's settings when performing message handling tasks, such that messages are sent out in the required format. In particular, the MTA is configured such that it processes error messages in a manner that has been pre-determined by the user, so that processed error messages which are forwarded to the bounce server 12 are in the expected format. This enables the bounce server 12 to handle error messages more efficiently.

Figure 2:
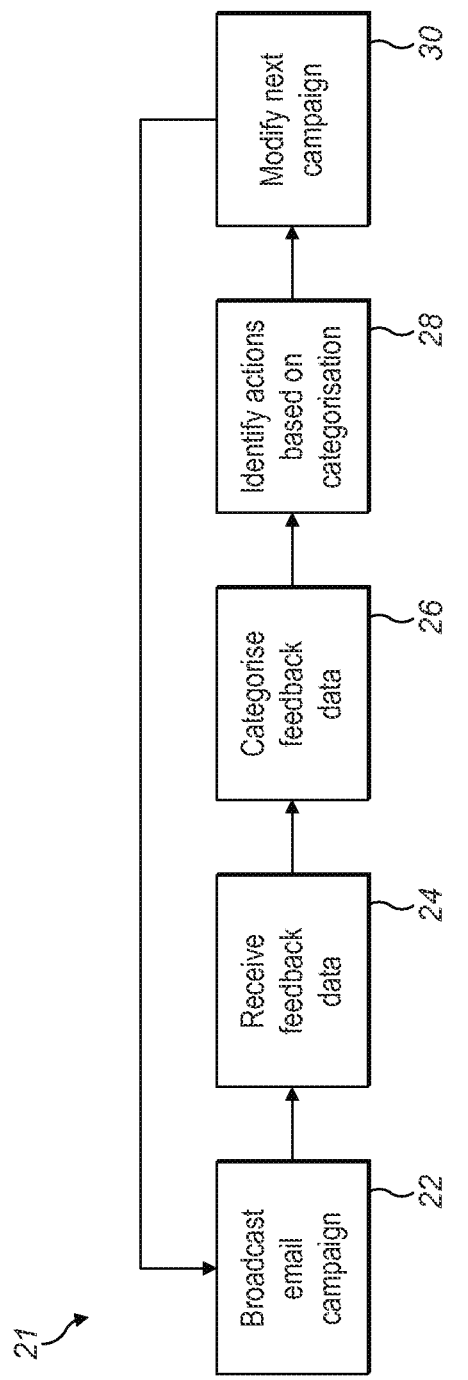
FIG. 2 is a flow diagram showing a process that the email distribution system in FIG. 1 uses in order to improve deliverability.

FIG. 2 illustrates a process 21 that the system 1 uses in order to improve the performance indicator of deliverability for email campaigns that are broadcast by the system 1. The process 21 starts when the system 1 broadcasts at Step 22 an email campaign using the scheduler module 10. Feedback data is then received at Step 24 by the bounce server 12. The feedback data is sent by ISPs 18, and relates to outcomes for emails broadcast in a recent campaign, including whether an email bounced, or whether a complaint was raised by a recipient 20 against an email. The feedback data includes an error code which indicates the specific cause of the bounce or complaint. Each ISP 18 uses a different set of error codes, and therefore translating the error codes to identify the cause of the bounce or complaint is not straightforward.

The bounce server 12 categorises at Step 26 the feedback data to determine whether it relates to a hard bounce, a soft bounce, or a complaint generated by a recipient 20. In addition to this, the bounce server 12 is arranged to further categorise the feedback data to identify the cause of the bounce or complaint. For this purpose, lists of the error codes used by several different ISPs 18 are held in the database 2. These lists are built up over time by an administrator of the system 1 through interaction with the ISPs 18. The bounce server 12 cross references the error code contained in the feedback data against the list corresponding to the ISP 18 from which the feedback data originated, in order to translate the error code into a more meaningful indication of the cause of the error or complaint. Details of the cause of the error or complaint are stored by the bounce server 12 in the database 2, as described below with reference to FIG. 3.

When a subsequent email campaign is to be created, the scheduler module 10 first reads the data relating to errors from previous campaigns, and then uses that data to identify at Step 28 an action to be taken in order to reduce the likelihood of receiving a similar error in the email campaign that is about to be created. For example, if the error code relates to a hard bounce indicating that the email address is not valid, the scheduler module 10 may identify that the email address should be removed from the database 2 in order to prevent the address from being included in future email campaigns. Alternatively, if the error code indicates that an attachment included with an email is too large, the scheduler module 10 may identify that a smaller attachment should be used in the next email campaign.

Accordingly, the scheduler module 10 modifies at Step 30 the new email campaign to take into account the actions identified at Step 28. The new email campaign is then broadcast, thus restarting the process 21. In this way, the process 21 provides a form of feedback control which continuously and dynamically adjusts email campaigns in order to improve the performance indicator of deliverability.

Figure 3:
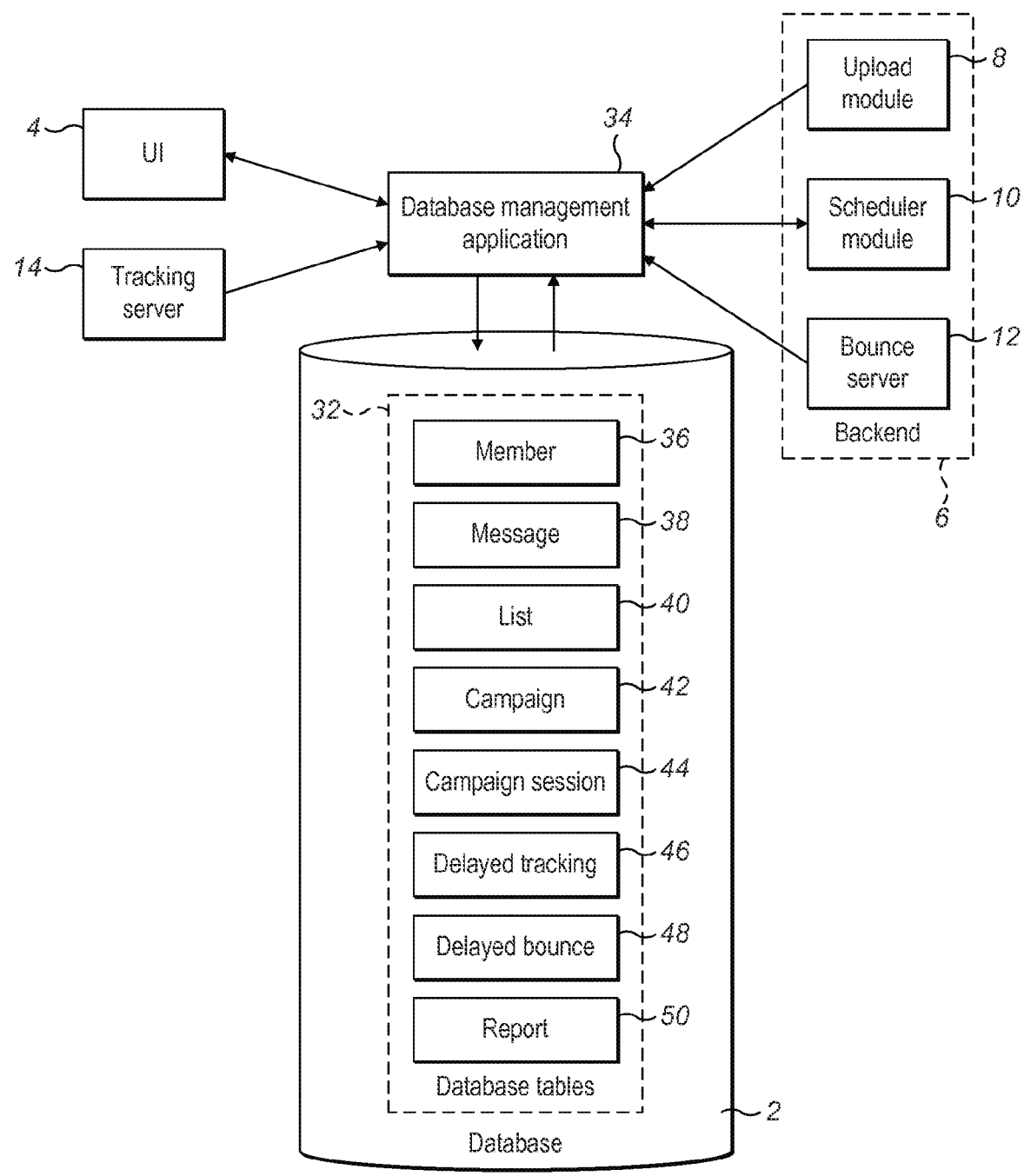
FIG. 3 is a schematic block diagram showing the architecture of the database in FIG. 1.

Referring now to FIG. 3, a schematic drawing illustrating the architecture of the database 2 is provided. As shown in the figure, the database is provided with a set of database tables 32 in which the data stored in the database 2 is organised. The process of reading and writing data to and from the database 2 is handled by a database management application 34. The UI 4, upload module 8, scheduler module 10, bounce server 12 and the tracker server 14 all read and/or write data to or from the database, as indicated by the arrows in the figure. All of the read/write operations are conducted via the database management application 34.

In this embodiment, the database tables 32 include the following specific tables:

- A "member" table 36, which is written to by the upload module 8 and is used to store the member list which includes data relating to all of a user's potential target recipients 20;
- A "message" table 38, which is written to by the UI 4, and is used to store details of the contents of the message to be sent out in a particular email campaign;
- A "list" table 40, which is used to store the selection of target recipients drawn from the full list contained in the "member" table who are to be the target recipients in a particular email campaign;
- A "campaign" table 42, which is used to store details of each campaign, including when the campaign is scheduled to be broadcast, and also configuration information to indicate the relevant portions of data should be extracted from the other database tables 32 in order to construct the email campaign;
- A "campaign session" table 44, which is used to record when a particular email campaign is sent out, and some preliminary data to indicate whether the email campaign was sent out successfully:
- A "delayed tracking" table 46, which is used by the tracker server 14 to store data relating to outcomes for a particular email campaign, including messages picked up by the tracker server 14 to indicate that a recipient has opened an email message sent as part of the campaign;
- A "delayed bounce" table 48, which is used by the bounce server 12 to record bounce error messages which are generated after an email campaign is broadcast.
- A "report" table 50, which is used to store a report for each email campaign which is sent out, where the report is at least in part created by collating the events which are recorded in the "delayed tracking" and "delayed bounce" tables 46, 48.

When the user configures a new email campaign through the UI 4, a corresponding set of data is stored in each of the database tables 32. The scheduler module 10 regularly checks the "campaign" table 42 to see whether there are any campaigns which have been scheduled for broadcasting, and if so the scheduler module 10 uses the data in the "campaign" table 42 to retrieve the corresponding data from all of the other tables 32 for that campaign. The scheduler module 10 then uses this data to construct the campaign and broadcast it via the MTA 16.

Figure 4:
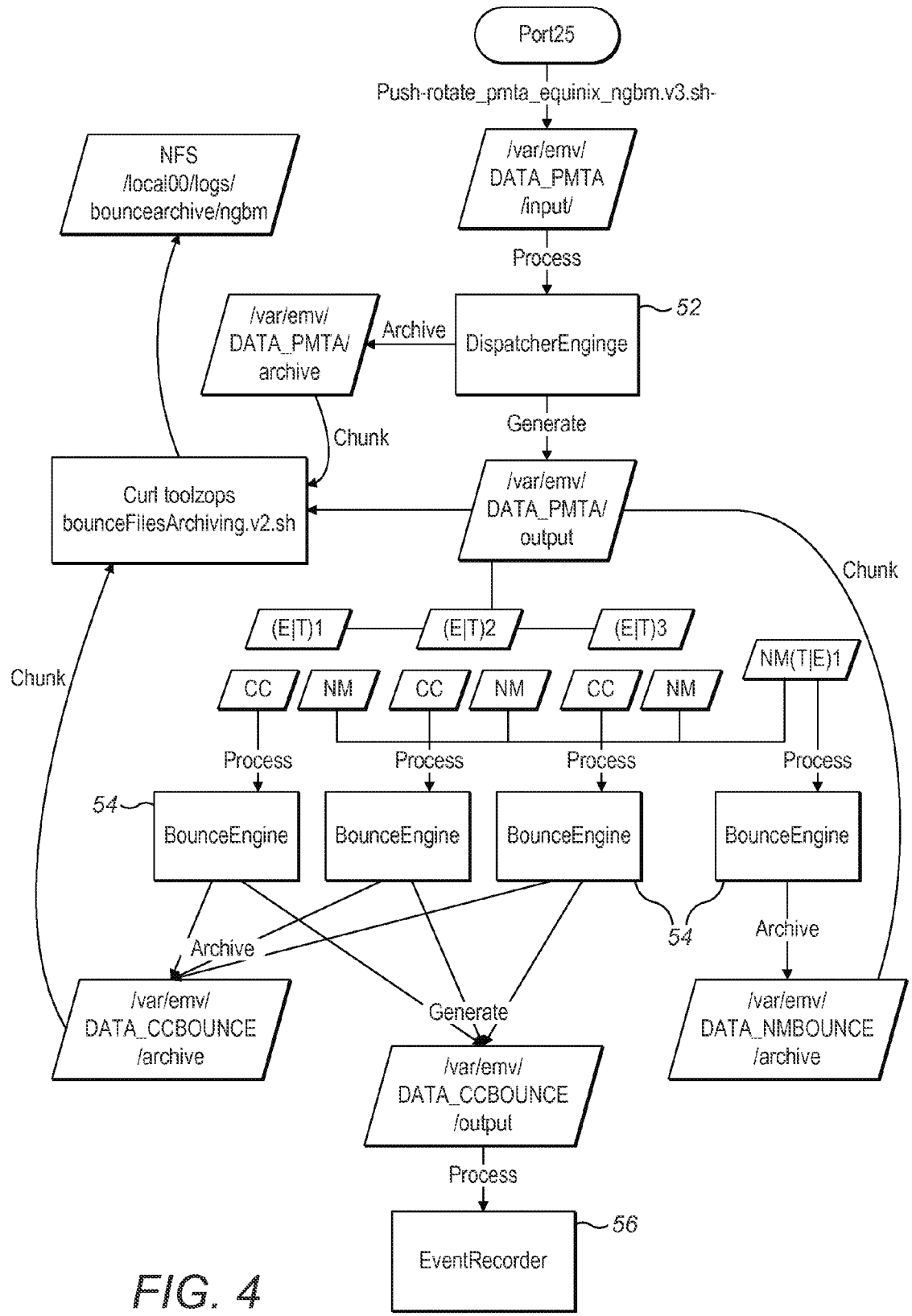
FIG. 4 is a schematic block diagram showing the architecture of the bounce server in FIG. 1.

FIG. 4 shows the structure of the bounce server 12 in more detail. The bounce server comprises a dispatcher engine 52, a bounce engine 54, and an event recorder 56.

The dispatcher engine 52 receives processed synchronous bounce errors from the MTA 16, and raw asynchronous bounce errors from ISPs 18. The dispatcher engine 52 then categorises the bounces, and forwards them to the bounce engine 54. The bounce engine 54 then records the bounce error in the appropriate database table 32. This information is then used by the scheduler module 10 to adjust and optimise future campaigns. FIG. 4 shows four instances of the bounce engine 54 to highlight the different ways in which it can be used though only one bounce engine 54 is provided. For example, the scheduler module 10 uses hard bounces to quarantine the addresses from which the hard bounces originate, to prevent persistent hard bounces. This is described more fully later with reference to FIG. 9.

There are three types of events that are generated and/or detected by the email distribution system 1: bounce events, which relate to bounce messages which are returned after email campaigns have been broadcast: sent events, which are indications that emails of a campaign have been sent; and tracking events, which is data relating to outcomes for a particular campaign. As described above, data relating to these events is stored in the appropriate tables in the database 2. The event recorder 56 is a component which is used to handle and process these events as they are received and/or generated. Therefore, in the case of the bounce server 12, an instance of the event recorder 56 is used to process the bounces as they are stored by the bounce engine 54.

The MTA 16 is configured to produce a signature for each bounce error, the signature having a pre-defined format to provide compatibility with the email distribution system 1. In this embodiment, the signature is composed of three elements: a platform ID, which identifies the particular platform hosting an email distribution system 1 from which the email originated; a campaign ID, which identifies the specific campaign that the email was sent out as a part of; and a member ID, which identifies the intended recipient 20 of the email which bounced. Unlike many conventional methods, the MTA 16 is arranged to check the SMTP portion of the bounce error message first in order to extract the required information, prior to checking any error codes in the message, as this has been found to be more accurate than the conventional methods.

Once the MTA 16 has created the signature for the bounce error message, this is forwarded to the bounce server 12. The bounce server 12 creates the signatures for asynchronous bounce error messages in this embodiment. The signature enables the bounce engine 54 to record the bounce error in the database table 32 belonging to the user that created the campaign which the bounced email was a part of. Before the bounce engine 54 does this, the dispatcher engine 52 categorises the bounce error. This primarily entails identifying the bounce error as either a hard bounce, indicating a permanent error, or a soft bounce, indicating a temporary error. If the error is determined to be a temporary error, the dispatcher engine attempts to assign a likely cause for the error.

The ISP 18 attaches an error code to the error message which provides an indication of the cause of the error. However, each ISP uses different error codes, which means that interpreting the error code may not be straightforward. For this reason, an individual list of error codes for each ISP 18 is held in the database 2 for use by the bounce server 12. The lists are actively maintained by an administrator of the email distribution system 1 in order to keep the data as accurate as possible. Therefore, the dispatcher engine 52 can attempt to identify the cause of the error by first identifying the ISP 18 which created the bounce error message, and then comparing the error code contained in the message against the list of error codes for that particular ISP 18.

As noted previously, the bounce server 12 is arranged to receive and process complaints from the ISPs as well as bounce error messages. Complaints are handled in a similar manner to bounce errors, and are treated as a type of soft bounce; although in reality the email was successfully delivered, if a recipient 20 has indicated that the email is unwanted the email distribution system 1 is arranged to prevent the recipient from being targeted in future email campaigns. In an embodiment, there may be a buffer provided to require that several complaints are received from a particular recipient 20 before they are removed from the member list. This helps to ensure that a recipient 20 is not removed from the member list if they accidentally record an email as junk.

Figure 5:
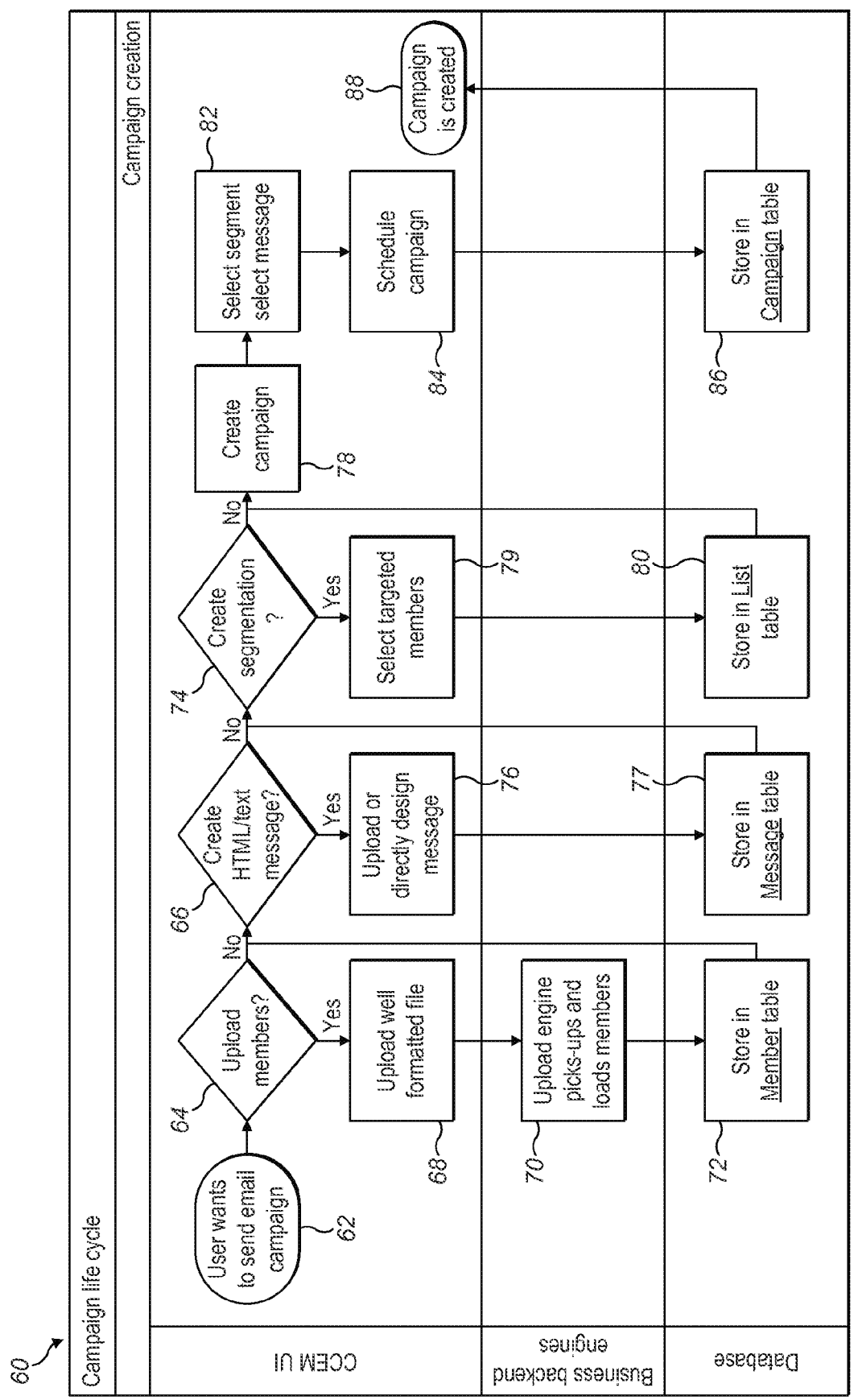
FIG. 5 is a flow diagram showing a process for configuring a new email campaign using the email distribution system in FIG. 1.

FIG. 5 illustrates a creation process 60 for creating a new email campaign using the email distribution system 1. The process begins when the user indicates at Step 62 that they wish to configure a new email campaign using the UI 4. The UI 4 then asks at Step 64 the user whether they wish to upload new target recipients or members to be added to the member list prior to configuring this campaign. If the user does not want to upload new members, the UI 4 then asks at Step 66 the user whether they wish to specify the message to be contained in the email messages which are sent out in the campaign. If the user does wish to upload new members, the user then uploads at Step 68 a file containing details of the new members. The upload module 8 then picks up this file and loads at Step 70 the data into memory, and then writes at Step 72 the new member data to the "member" table 36 in the database 2. The creation process 60 then moves on to the message creation question Step 66 as above.

If the user does not wish to specify a message to be contained in the email messages of the new campaign, the UI 4 then asks at Step 74 whether the user wishes to create a selection of the data stored in the user's "member" table 36 such that the email campaign is only sent to a selection of the user's member list. If the user does wish to specify a message, they then upload or directly create at Step 76 the message to be contained in the email campaign. The UI 4 then writes at Step 77 the message to the "message" table 38 of the database 2. The creation process 60 then moves on to the selection creation question at Step 74 as above.

If the user does not wish to create a selection, the UI 4 then creates at Step 78 the new email campaign according to the data provided by the user. If the user does wish to create a selection, they use the UI 4 to select at Step 79 a sub-set of target recipients 20 from the full list contained in the database 2, who are to be the target recipients 20 for the new email campaign. The UI 4 then stores at Step 80 the selection as defined by the user in the "list" table 40 in the database 2. The creation process 60 then moves on to the campaign creation Step 78 as above.

To create the new campaign, the UI 4 selects at Step 82 any data which has been provided by the user, including a message to be sent and a selection of members to send to if applicable. If the user did not define a message at Step 66, the UI 4 adds a default message for the campaign. If the user did not define a selection at Step 74, the UI 4 adds all of the user's members to the new campaign. The UI 4 then schedules 84 a time for the new campaign to be broadcast, and then the UI 4 writes at Step 86 the parameters which define the new email campaign to the "campaign" table 42 in the database 2. Creation of the campaign is then completed at Step 88, and the creation process 60 ends.

Figure 6:
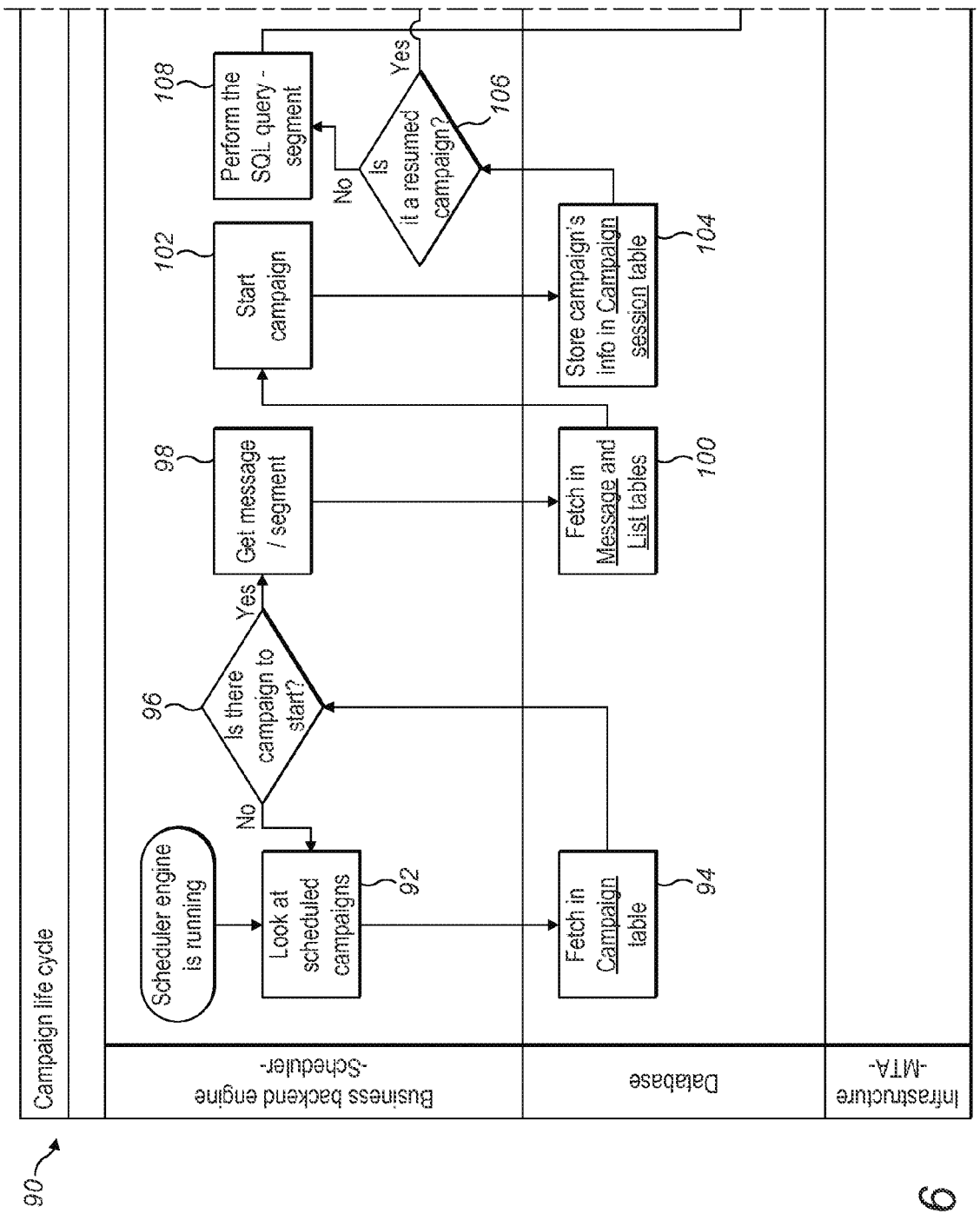
FIG. 6 is a flow diagram showing a process for sending out an email campaign using the email distribution system in FIG. 1.
Figure 6:
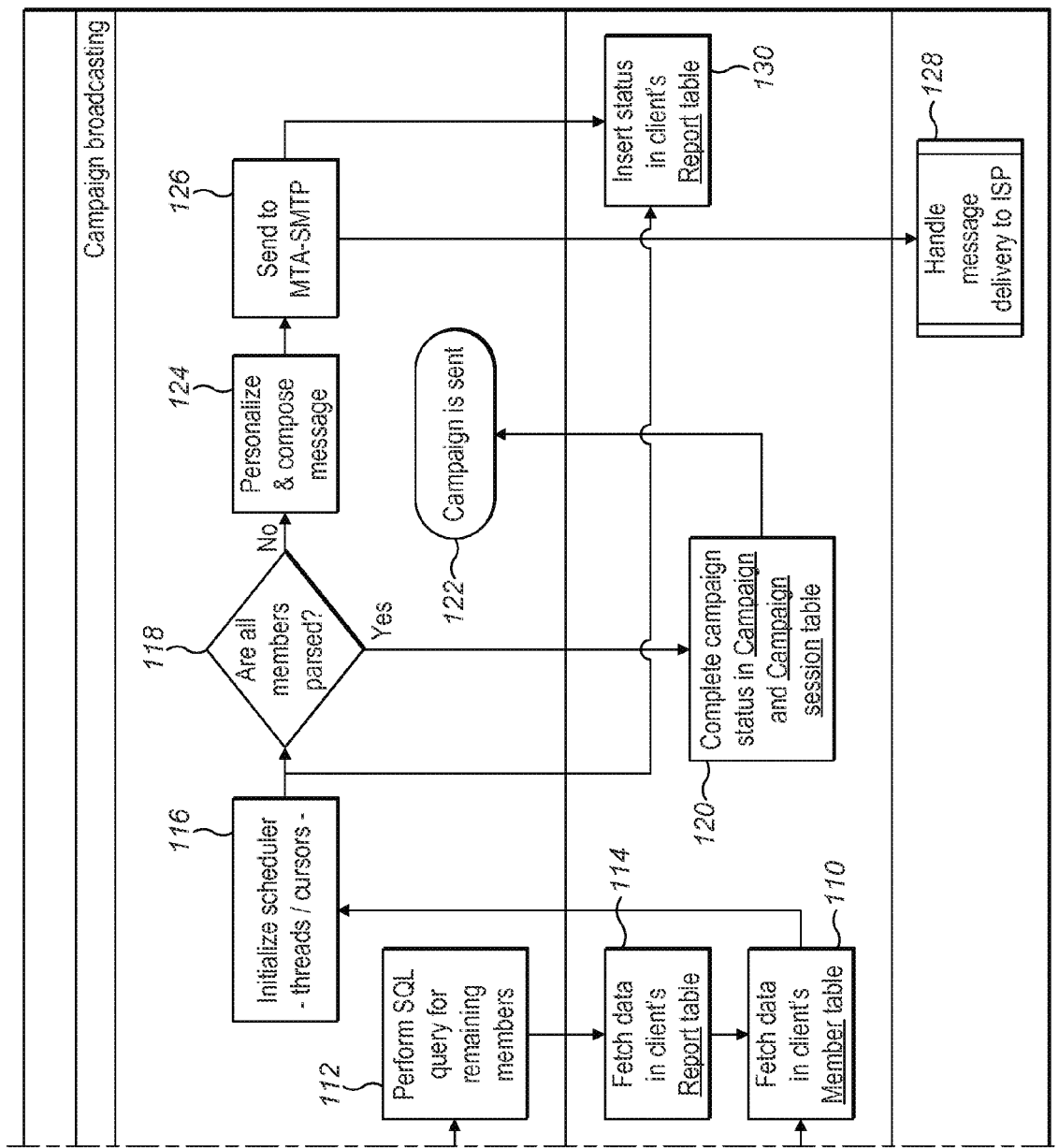

FIG. 6 illustrates a broadcasting process 90 which is performed by the scheduler module 10. The scheduler module 10 first checks at Step 92 whether there are any email campaigns which are scheduled for broadcasting. To do this, the scheduler module 10 retrieves at Step 94 data from the "campaign" table 42 which contains information regarding all scheduled campaigns which have been created by the user through the creation process 60. The scheduler module 10 then checks the data and confirms at Step 96 whether there is a campaign scheduled for broadcasting. If not, the broadcasting process 90 returns to Step 92 and continues to check for scheduled campaigns. If the scheduler module 10 finds a campaign which is scheduled for broadcasting, the scheduler module 10 then compiles at Step 98 the corresponding campaign data by reading at Step 100 the data from the "message" and "list" tables 38, 40 in the database 2.

Once this data has been retrieved, the scheduler module 10 then starts at Step 102 the new email campaign. The scheduler module 10 then stores at Step 104 data in the "campaign session" table 42 to indicate the time at which the campaign started. Next, the scheduler module 10 checks at Step 106 whether the campaign is one which has previously been started and is therefore to be resumed, or whether the campaign is to be started from the beginning. If the campaign is to be started from the beginning, the scheduler module 10 performs at Step 108 an SQL query via the database management application 34, and then retrieves at Step 110 the list of members to be included in the campaign from the member list in the database 2.

If the scheduler module 10 determines that the campaign is to be resumed, the schedule module performs at Step 112 an SQL query via the database management application 34, in order to determine the remaining members to direct the email campaign to who have not yet been sent the email message. This data is read at Step 114 from the user's "report" table 50. The broadcasting process 90 then moves on to the member list retrieval Step 110 in order to retrieve data for the members identified in Step 114.

Once the correct list of members has been retrieved, the scheduler module 10 initialises at Step 116, and records at Step 130 the status of the broadcast, in this case the time of initialisation, in the "report" table 50. The scheduler module 10 then checks at Step 118 whether all of the members have already been parsed. If so, the scheduler module 10 completes at Step 120 the campaign status in the "campaign" and "campaign session" tables 42, 44 to indicate the time at which the campaign is determined to be finished, and then the broadcasting process 90 ends at Step 122 as the campaign is considered sent.

If the scheduler module 10 finds that not all of the members have been parsed, the broadcasting process 90 moves on and the scheduler module 10 personalises and/or composes at Step 124 the message to be sent in each email message as specified by the data retrieved from the "message" table 38. Therefore, each recipient 20 is sent an email which is addressed to them personally. The scheduler module 10 then sends at Step 126 the campaign to the MTA 16 for broadcasting at Step 128 to ISPs 18. The scheduler module 10 then records at Step 130 the time at which the campaign was sent in the "report" table 50, and the broadcasting process 90 ends.

Figure 7:
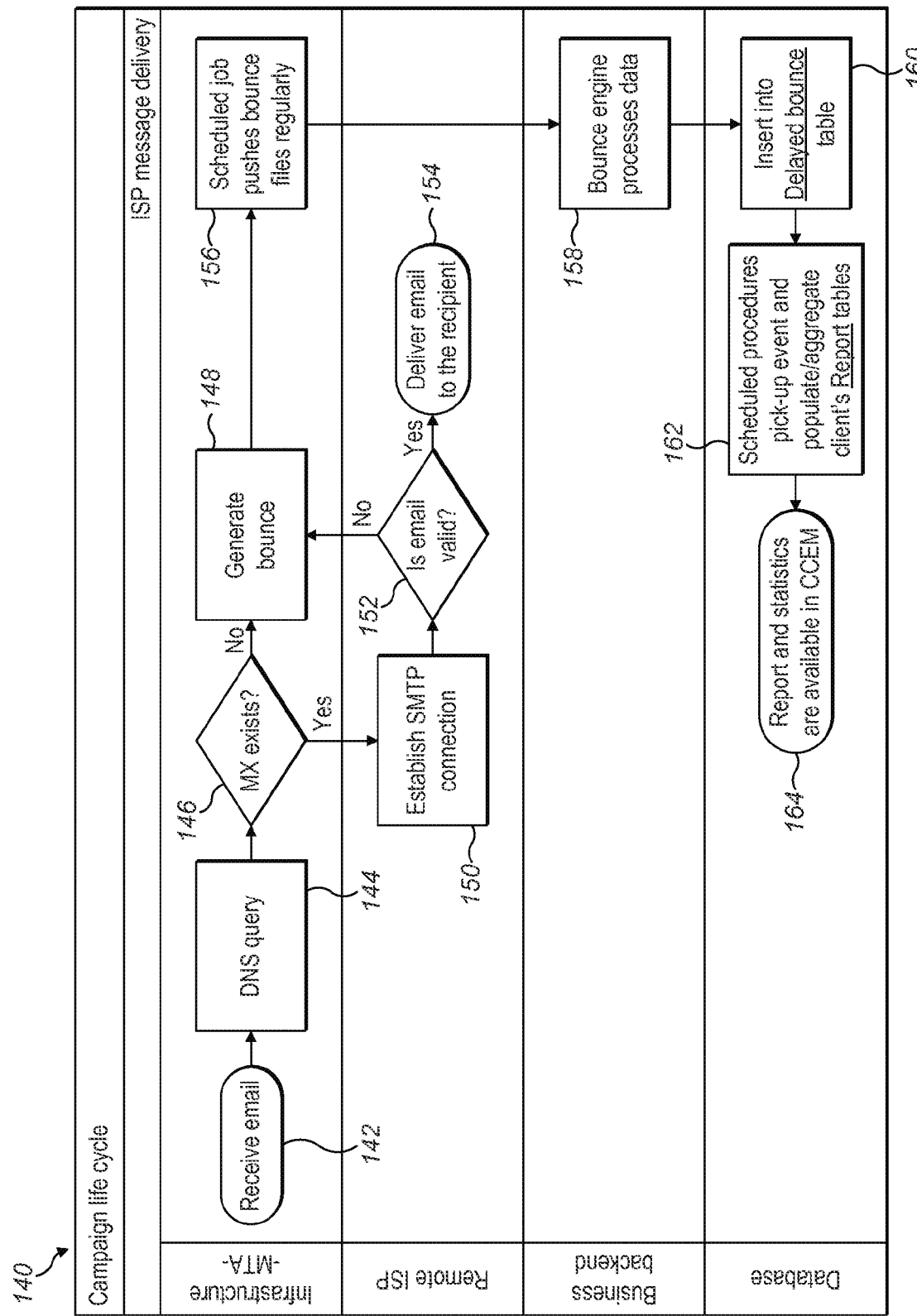
FIG. 7 is a flow diagram showing a process for recording bounced email messages from an email campaign which has been distributed using the email distribution system in FIG. 1.

In FIG. 7, a message delivery process 140 which is conducted by the MTA 16 is illustrated. The MTA 16 receives at Step 142 an email from the scheduler module 10, where the email is to be sent out as part of a new campaign. The MTA 16 then performs at Step 146 a DNS query to determine the IP address to which the domain name contained in the email message relates, and to find the appropriate MX server to handle the email. If the MTA 16 cannot find the correct MX server, the MTA 16 generates at Step 148 a bounce error. Alternatively, if the MTA 16 is able to identify the correct MX server, the MTA 16 establishes at Step 150 an SMTP connection with the MX server. The MTA 16 receives at Step 152 an indication from the MX server as to whether the email is valid. If the email is valid, it is delivered at Step 154 to the recipient 20. If the email is not valid, the message delivery process moves to Step 148 and generates a bounce error as above.

For cases where a bounce error has been generated, the bounce error is pushed at Step 156 to the bounce server 12 by the MTA 16 according to a scheduled task. The bounce server 12 then processes at Step 158 the bounce error data in order to categorise the type of bounce. This information is then inserted at Step 160 into the "delayed bounce" table 48. The database management application 34 then conducts at Step 162 a scheduled task to read out the new bounce error from the "delayed bounce" table 48, and to use the bounce error to update the "report" table 50. The message delivery aspects of the campaign report are then complete and are made available at Step 164 for the user to view. The message delivery process 140 then ends.

Figure 8:
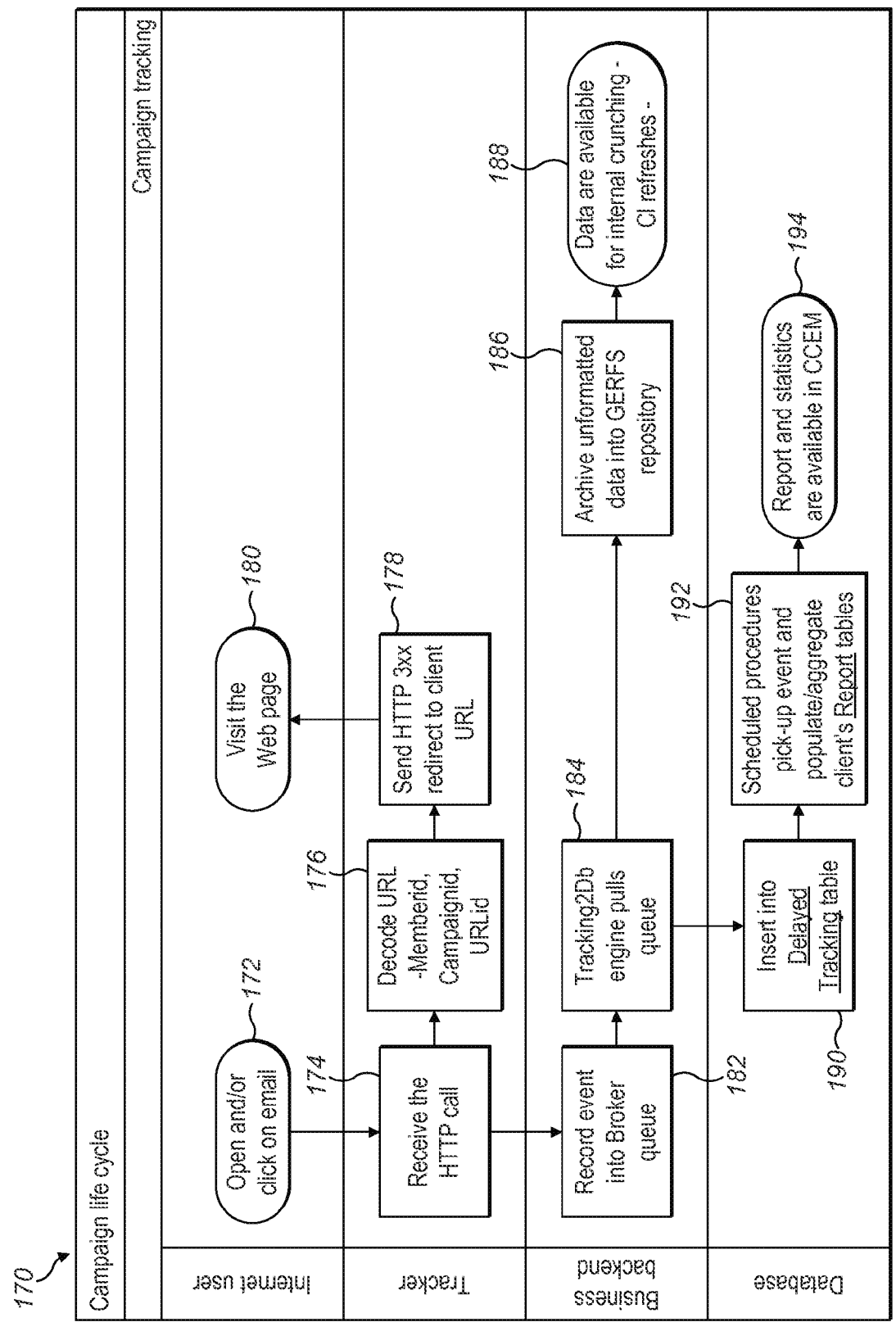
FIG. 8 is a flow diagram showing a process for tracking an email campaign which has been distributed using the email distribution system in FIG. 1.

FIG. 8 illustrates a tracking process 170 which is conducted by the tracker server 14. The tracking process 170 is initiated when a recipient 20 opens at Step 172 an email sent to them as part of a campaign. When the recipient 20 opens and/or clicks on the email, the email is arranged to send an http call back to the email distribution system 1, which the tracker server receives at Step 174. The tracker server 14 then decodes at Step 176 the http call to determine the identity of the recipient 20 and the details of the campaign that the email was sent as a part of. Once this information has been obtained, the tracker server 14 then determines the appropriate link for the web page that the recipient 20 should be directed to, and sends at Step 178 an http 3xx status code to the recipient 20 to redirect them. The recipient 20 then views at Step 180 the desired web page.

At the same time as Steps 176 to 180 are being carried out, a standard middleware message broker application, for example "Apache ActiveMQ", which is located in the back-end 6, records at Step 182 the event into a broker queue. The broker queue is a queue of data tracking events created using the message broker application. A tracking 2Db engine, which is a process which is used to manage the message broker queue, then pulls at Step 184 the queue, and archives at Step 186 the unformatted data into a Generic Event Recorder File System (GERFS) repository. The GERFS is a datastream which sits alongside and distinct from the main database 2, and the repository is a separate database which is used to store the tracking data (these components are not shown in FIG. 1). The data is then made available at Step 188 for internal processing.

Alongside Steps 186 and 188, the queue which has been pulled by the tracking 2Db engine is inserted at Step 190 into the "delayed tracking" table 46 provided in the database 2. The database management application 34 then conducts at Step 192 a scheduled task to read out the queue from the "delayed tracking" table 46, and to use the data in the queue to update the "report" table 50. The tracking aspects of the campaign report are then complete and are made available at Step 194 for the user to view. The tracking process 170 then ends.

Figure 9:
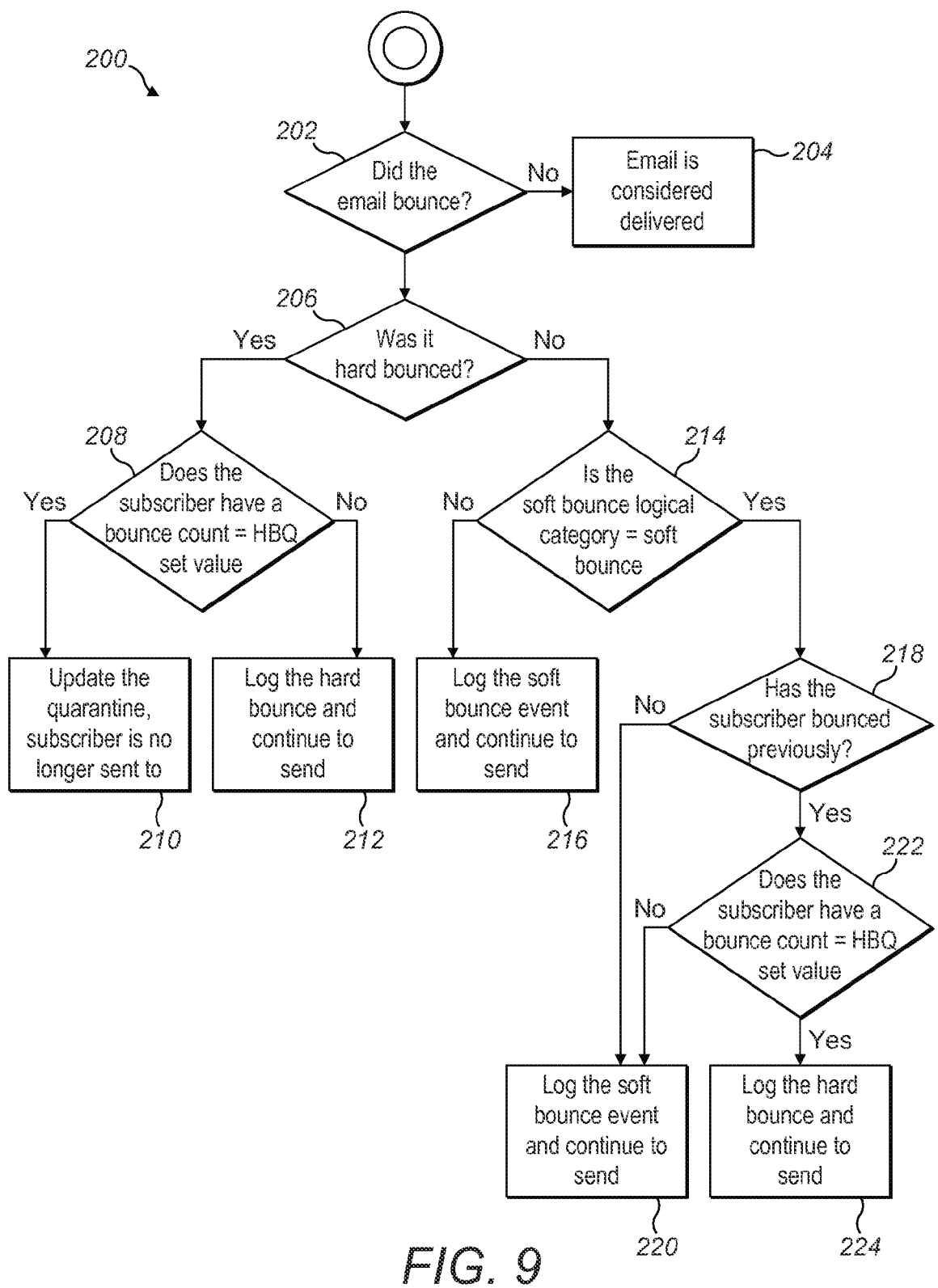
FIG. 9 is a flow diagram showing a process for analysing bounce events recorded by the process in FIG. 8.

FIG. 9 illustrates a procedure 200 which is conducted by the bounce server 12 for maintaining a quarantine in the database 2 which is used to store recipient addresses which are no longer to be sent to. The quarantine has a hard-bounce quota (HBQ) value associated with it, which is used to determine when a recipient address should be removed from the member list and placed into the quarantine. The procedure commences by determining at Step 202 whether an email bounced. If the email did not bounce, the email is considered at Step 204 to be delivered, and the procedure 200 moves on to the next email.

If the email did bounce, the bounce server 12 then determines at Step 206 whether it was a hard bounce, i.e. a permanent error as defined previously. If the bounce is determined to be a hard bounce, the bounce server 12 checks at Step 208 whether the current number of hard bounces recorded against the recipient 20 from which the bounce error originated is equal to the HBQ set value. If so, the bounce server 12 updates at Step 210 the quarantine by adding the recipient address, meaning that this recipient 20 is no longer targeted. If the HBQ value is below the set value, the hard bounce is logged at Step 212, but the recipient 20 is not moved into quarantine.

If the bounce is determined as not a hard bounce at Step 206, the bounce server 12 then checks at Step 214 whether the bounce falls into the "soft-bounce" logical category. If the bounce does not fall into the "soft-bounce" logical category, the bounce is logged at Step 216, and the recipient 20 is kept on the member list such that they will be included in future campaigns. If the bounce is determined as falling into the soft-bounce logical category, the bounce server 12 checks at Step 218 whether there has been a previous bounce for this recipient 20. If not, the bounce server logs at Step 220 the bounce event, and the recipient 20 is kept on the member list such that they will be included in future campaigns.

If the emails addressed to this recipient 20 have bounced previously, the bounce server 12 checks at Step 222 whether the current number of hard bounces recorded against the recipient 20 from which the bounce error originated is equal to the HBQ set value. If so, the bounce server 12 logs at Step 224 a hard bounce but the recipient 20 remains on the member list. If not, the procedure 200 moves on to Step 220 as above.

In this way, the procedure 200 ensures that incorrect recipient addresses are identified and removed from the member list, to avoid persistent hard bounces. This beneficially keeps the number of hard bounces resulting from email campaigns which are sent out by the email distribution system 1 to a minimum. Therefore, the user's sender reputation is protected, which helps to ensure that email deliverability remains at an acceptable level. By introducing the HBQ set value, a known problem of soft bounces appearing as hard bounces can be accounted for, in that recipients 20 are not removed from the member list after a single hard bounce. If several hard bounces are received relating to a particular recipient 20, it is highly likely that the address is genuinely incorrect, and therefore the recipient 20 is removed from the member list.

Furthermore, the procedure 200 also provides a way to use soft bounces to further refine the way in which the member list is controlled. The procedure 200 treats persistent soft bounces as equivalent to a hard bounce, therefore accounting for repeating soft bounces which may also damage sender reputation, while recognising that soft bounces are of lesser significance than hard bounces.

FIG. 10 summarises a variety of different types of bounces to provide examples of how the bounce server 12 categories bounce error messages when it receives them. As shown in the figure, and as described previously, there are only two different types of bounce: hard bounce and soft bounce. A hard bounce is a permanent error which does not require further categorisation for the purposes of the email distribution system 1. In contrast, there are many different kinds of soft bounce, and it is important that the bounce server 12 can determine which kind it is receiving in order to handle the error message correctly. In the figure, a method for categorising soft bounces according to an embodiment of the invention is shown, in which the soft bounces are divided into four groups: "block", which includes all error messages which are generated when an ISP 18 blocks an email; "quota", which indicates that the recipient's mailbox is not able to accept the email at that time, perhaps because it is full: "technical", which indicates a technical error such as a server being too busy to respond; and "other", which is used for errors which do not fall into the first three groups.

Within each group the bounce errors are assigned a category and a logical group. Finally, the table indicates typical actions which may be taken for each group of errors. Recipient addresses which result in hard bounces are quarantined, as described above. Recipient addresses for which a "quota"

group error is returned may also be quarantined temporarily. This ensures that time is allowed for the problem to be resolved, without further soft bounces being generated in the meantime, as this would have a detrimental effect on deliverability.

The other groups of soft bounces do not have actions associated with them in this embodiment; however the data is useful, as analysing it can reveal problems or patterns which may be used to improve future email campaigns to provide increased deliverability.

Figure 11:
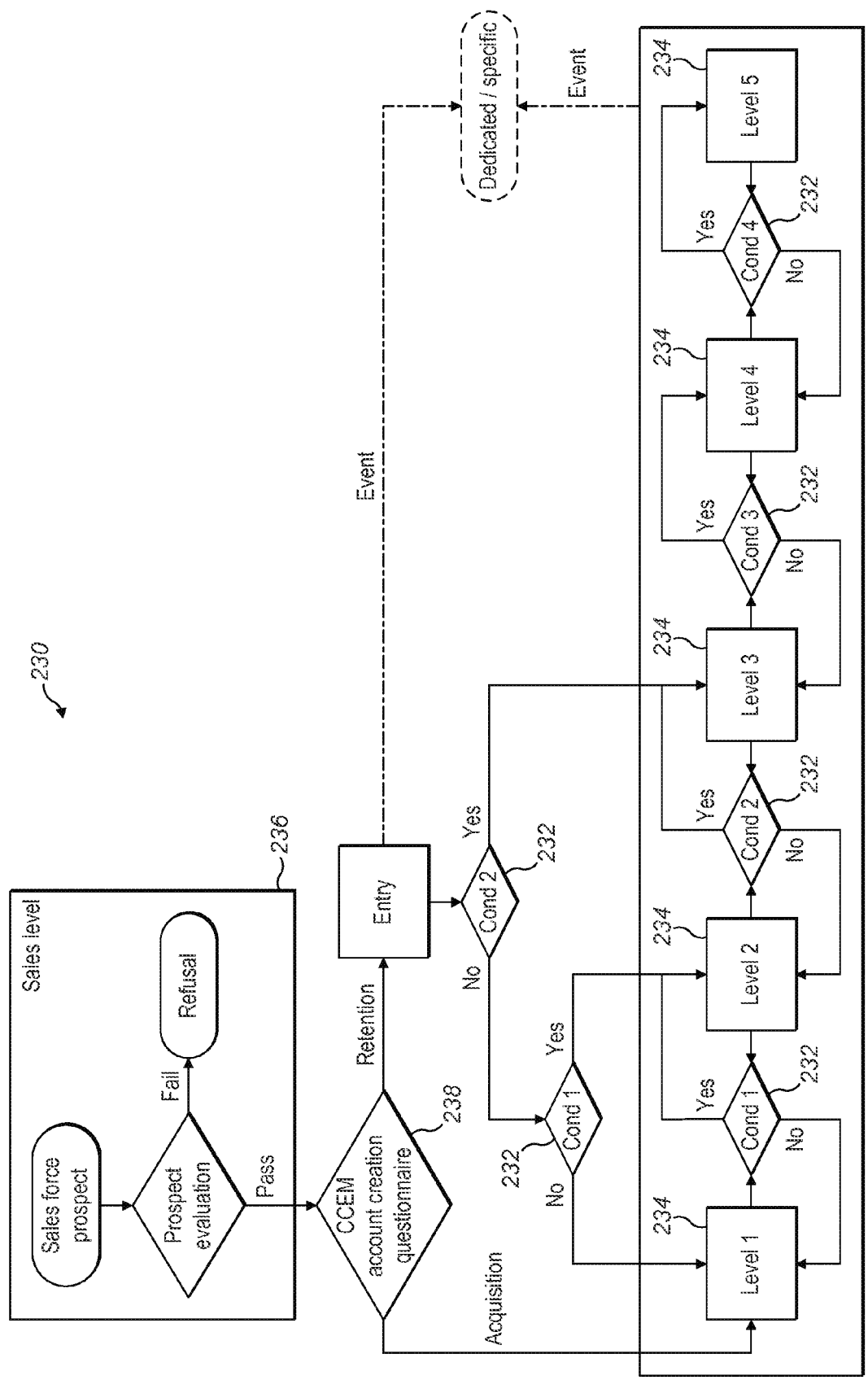
FIG. 11 is a flow diagram showing a process by which users may be assigned to different levels indicative of the quality of the user.

FIG. 11 illustrates a system 230 that is used to group users according to the quality of their output (namely the quality of their email campaigns). A good quality user is one that, for example, complies with all legal requirements and has a consistent output. A poor quality user is one that, for example, appears on a number of blacklists, or sends out illegal content in their email campaigns. Each grouping is assigned a quality level 234 and the present embodiment has five different quality levels 234, though in different embodiments any number of levels can be employed. Each quality level 234 has a corresponding group email address which is used for all emails which are sent by members of that grouping or users at that level 234 in place of the sender's own email address. The common email address may have a common domain (corresponding to a common grouping) but allow different users of that domain (e.g. member1@level1.com, member2@level1.com, member3@level1.com, etc) or alternatively a single common email address for each group can be used (e.g. member@level2.com). In practice, when an email campaign is to be broadcast, the system may check the identity of the sender of the email campaign and determine whether their identity is provided in one of the quality levels. If the sender's identity is found in one of the pooled groups which make up a particular quality level 234, then the email address associated with that pooled group (quality level 234) is substituted in for the email address of the sender so as to benefit from the existing reputation of the members of the pooled group (quality level 234).

The system 230 has a number of pre-defined conditions 232 which are used to assess the user and to assign the user to an appropriate quality level 234 of the plurality of quality levels provided. Once the user has been assigned to a particular quality level 234 they remain at that level 234 until they either meet the condition to move up to the next quality level 234, or no longer meet the condition 232 for entry into their current quality level 234, in which case the user is moved down one level 234. There is no limit on the number of quality levels 234 which are included with the system 230, as the system 230 is arranged to evolve over time to meet changing market requirements and expectations by adding new quality levels 234 with additional associated entry conditions 232.

One benefit of assigning a quality level 234 to each user is that all users at a certain level 234 may be pooled together in order to link their sender reputations by sending out all of the campaigns for users in a particular quality level 234 from the same IP address (or at least the same IP address domain—see above examples). This advantageously means that an overall email campaign sender reputation for each level 234 can be managed, and that measures to improve deliverability and sender reputation for each particular quality level 234 can be applied globally for each user in that level 234. Pooling the users in this way also provides a higher level of consistency in terms of deliverability for each of the users in that level 234. This creates a key advantage of the system 230, in that a user's deliverability can be predicted according to the level 234 in which they are placed, and furthermore, that by improving their practices and moving up a level, a user can measurably improve their deliverability in a predictable manner. Accordingly, the system 230 builds on the previously described measures implemented by the email distribution system 1 for improving deliverability by offering a predicted deliverability for email campaigns for each user based on how many conditions 232 the user fulfils. Here the 'deliverability' is realised as a delivery performance indicator which relates to the likelihood of the messages of the mail campaign being successfully delivered to the intended recipients.

An additional benefit to this system 230 is that, while the sender reputation which is based on IP address is shared between users at the same level 234, the users can still build up an individual domain name-based sender reputation as they broadcast campaigns. This is helpful to the user, as they start with no reputation at all; therefore this approach allows the user to build up a sender reputation in a controlled manner. Also a new user with no substantial history or reputation can immediately benefit from being pooled with a group of users having a better established history and thus possibly a better reputation. Such a historical track record can itself be a factor in minimising bounces.

The process for assigning a new user to a level 234 is now described. A prospective new user wishing to set up account to use the email distribution system 1 is first directed to a sales level 236 when joining the system 230. The user is evaluated at the sales level 236 to determine whether the user meets a set of minimum requirements. If not, the user is refused. If they meet the minimum requirements, the user then completes a questionnaire 238 which is used to determine which conditions the user fulfils. The first step the system 230 takes is to categorise the user as either an 'acquisition-type' user or a 'retention-type' user. Retention-type users are primarily concerned with retaining existing customers, and their email campaigns are structured accordingly. A retention-type customer is inherently of higher quality, as they have an existing customer base. Acquisition type users are primarily concerned with trying to acquire new customers. Therefore, emails sent by acquisition-type users are more likely to be unwanted by the target recipients 20 compared with emails sent by retention-type customers, thus acquisition users are considered to be inherently lower quality.

Therefore, acquisition-type users are initially assigned to level 1 by default, and they work their way up through the levels 234 from that point. Retention-type users are checked against a higher level condition 232 (condition 2 in the figure), which, if the user fulfils the condition 232, gives the user the opportunity to move directly into level 3. If the retention-type customers do not fulfil condition 2, they are then checked against condition 1. If the user fulfils condition 1, they are assigned to level 2, otherwise the user is assigned to level 1.

Thereafter, the users move up and down the levels 234 according to the entry conditions that the users fulfil over time, as described above. Additionally, if a user generates an event 240 which may affect sender reputation, corresponding to the dashed line in the figure, this is considered by the system 230 in order to determine whether a change in level 234 is warranted.

It will be appreciated by a person skilled in the art that the present invention could be modified to take many alternative forms to that described herein, without departing from the spirit and scope of the appended claims.

The invention claimed is:

1. A computer-implemented method of handling a current email messaging campaign to be broadcast to increase a deliverability parameter regarding a percentage of the campaign which has been successfully delivered, the email messaging campaign comprising a plurality of email messages with the same message content and a plurality of different email addresses to send the message content to, the method being implemented on a processor and comprising:

receiving feedback data relating to a delivery error arising from a previous email messaging campaign previously broadcast to a plurality of recipients;

categorizing the feedback data into one of a plurality of categories to identify a type of error;

selecting one of a plurality of predetermined corrective actions based on the category of the feedback data determined in the categorizing step; and dynamically and automatically modifying the current outgoing email messaging campaign which has yet to be broadcast using the corrective action chosen in the selecting step;

wherein:

the plurality of categories comprises:
a hard bounce, indicating an incorrect e-mail address; or
a soft bounce, indicating any other reason why the email has not been delivered despite it having the correct email address;

the categorizing step further comprises categorizing the feedback data into one of a plurality of sub-categories specifically identifying the cause of the non-delivery of the email;

and the method further comprises:
determining whether the bounce error for a particular email address falls into a soft-bounce logical sub-category if the categorizing step categorizes the delivery error as a soft bounce;
checking whether there is a record of the particular email address having any bounces recorded against it from previous e-mail messaging campaigns;
establishing a hard-bounce quota value and comparing a current value of a hard-bounces counter for this email address against the hard-bounce quota value; and
recording the soft bounce as a hard-bounce error in a data store and continuing to allow emails to be sent to the email address if the current value of the hard-bounces counter equals the hard-bounce quota value.

2. The method of claim 1, wherein the receiving step comprises receiving feedback data relating to a plurality of different email addresses and the categorization step comprises categorizing the feedback data in respect of each email address into one of a plurality of categories.

3. The method of claim 1, wherein the receiving, categorizing, selecting and modifying steps are repeated each time an email campaign has been transmitted and a new email campaign is to be handled.

4. The method of claim 1, further comprising generating an alert and sending the same to a user interface if a predetermined category of feedback data is received.

5. The method of claim 1, wherein the feedback data is received both synchronously and asynchronously with the transmission of the email campaign.

6. The method of claim 1, wherein the receiving step comprises receiving additional feedback data relating to a correctly delivered email message which has an associated recipient complaint made by the recipient of the email message.

7. The method of claim 6, wherein the categorization step comprises categorizing the feedback data as any one of a group comprising:
a delivery error for an email of the campaign to an intended recipient and a cause of the delivery error; and
a complaint raised by a recipient having received an email message from the email campaign and a type of the complaint.

8. The method of claim 7, wherein the categorizing step comprises further categorizing the feedback data categorized as a delivery error into one of a group of categories comprising:
a hard bounce, indicating an incorrect e-mail address; or
a soft bounce, indicating any other reason why the email has not been delivered despite it having the correct email address.

9. The method of claim 1, further comprising: incrementing a counter of hard-bounce errors for a particular email address in a data store if the categorizing step categorizes the delivery error as a hard bounce.

10. The method of claim 9, further comprising: establishing a hard-bounce quota value; and comparing a current value of the hard-bounces counter for the particular email address against the hard-bounce quota.

11. The method of claim 10, wherein the selecting step further comprises:
selecting an action to put the particular email address into a quarantine list if the current value of the hard-bounces counter equals the hard-bounce quota value and the modifying step comprises taking action to preventing any further emails from being sent to the particular address.

12. The method of claim 10, further comprising continuing to allow emails to be sent to the email address if the current value of the hard-bounces counter is less than the hard-bounce quota value.

13. The method of claim 1, wherein the further categorizing step comprises:
identifying a source server which created the feedback data;
reading an error code provided in the feedback data by the source server; and
using results of the identification and reading steps to look up a stored meaning of the error code within a database of lists of stored error codes for a plurality of different source servers.

14. The method of claim 13, wherein the source server comprises an internet service provider (ISP) server or a Message Exchange server (MX server).

15. The method of claim 1, wherein the further categorizing step comprises: specifically categorizing the feedback data into one of the group of sub-categories comprising:
Group (1) a "block" group, indicating that the email was not delivered because the ISP deliberately blocked the email message;
Group (2) a "quota" group, indicating that the email was not delivered because a quota was exceeded;
Group (3) a "technical" group, indicating that the email was not delivered due to a technical problem; and
Group (4) an "other" group, indicating that the email was not delivered for a reason not covered by Groups (1) to (3).

16. The method of claim 15, wherein the selecting step further comprises selecting an action to put the particular email address to which the feedback data relates into a quarantine list for a temporary period of time, if the feedback data has been categorized into the sub-category of the 'quota' group, and the modifying step comprises taking action to preventing any further emails from being sent to the particular address for the temporary period of time.

17. The method of claim 1, further comprising recording the soft-bounce event in a data store and permitting email messages of the current and future campaigns to continue to be sent to the particular email address if the determining step determines that the particular email address does not fall into a soft-bounce logical sub-category.

18. The method of claim 1, further comprising recording the soft-bounce event in a data store and permitting email messages of the current and future campaigns to continue to be sent to the particular email address if the checking step determines that there is no record of use of the particular email address having generated any bounce errors previously.

19. The method of claim 1, further comprising recording the soft-bounce event in a data store and permitting email messages of the current and future campaigns to continue to be sent to the particular email address if a current value of the hard-bounces counter is less than the hard-bounce quota value.

20. The method of claim 1, wherein the categorization step comprises determining a transmission signature of the email to establish the specific email campaign to which the e-mail message relates.

21. The method of claim 20, wherein the determining step comprises determining a platform identifier from which the delivery error e-mail originated, a campaign identifier which identifies the email campaign from which the email message was sent, and a member identifier which identifies the intended recipient of the email message.

22. The method of claim 20, wherein the determining step comprises checking an SMTP portion of the email for the transmission signature.

23. The method of claim 20, further comprising using the transmission signature to look up a previously transmitted campaign and to modify stored parameters related to that campaign.

24. The method of claim 1, wherein the modifying step comprises modifying a stored list of email addresses related to an email-messaging campaign and source entity.

25. The method of Clam 1, wherein the corrective action selected by the selecting step and carried out by the modifying step relates to the specific cause of an error or type of complaint related to the feedback data.

26. A computer-implemented method of transmitting an email-messaging campaign, the method comprising transmitting a first e-mail messaging campaign, implementing a method of handling a current email-messaging campaign to be transmitted on a second email-messaging campaign as described in claim 1, and transmitting the second email-messaging campaign.

27. The method of claim 26, further comprising: creating the email-messaging campaign, the creating step comprising:
formulating content for the messages and storing the content in a content table;
uploading a plurality of members to a campaign member table,
selecting a subset of the plurality of members and a subset of the content; and
linking the subset of selected members to the selected content for the email-messaging campaign.

28. The method of claim 27, wherein the linking step is carried out in advance of transmitting the second email-messaging campaign.

29. The method of claim 27, further comprising selecting a time for broadcast of the campaign and storing the time and the linked subset of selected members and selected content in a campaign table in a database.

30. The method of claim 29, wherein the step of transmitting the second email messaging campaign comprises:
extracting all of the required data from the campaign table in the database;
constructing a plurality of email messages from the extracted data;
transmitting the plurality of email messages; and
updating a status of the second email-messaging campaign in a reporting table.

31. The method of claim 30, wherein the step of transmitting the plurality of email messages comprises sending the plurality of email addresses to an Message Transfer Agent (MTA) server where each email message is sent to an appropriate Internet Service Provider (ISP).

32. The method of claim 26, further comprising tracking the delivery of the email campaign and recording any bounce errors generated in response to transmission of the email messaging campaign.

33. An email campaign system for handling a current email messaging campaign to be broadcast to increase a deliverability parameter regarding a percentage of the campaign which has been successfully delivered, the email messaging campaign comprising a plurality of email messages with the same message content and a plurality of different email addresses to send the message content to, the system comprising a plurality of processors for:
receiving feedback data relating to a delivery error arising from a previous email messaging campaign previously broadcast to a plurality of recipients;
categorizing the feedback data into one of a plurality of categories to identify a type of error;
selecting one of a plurality of predetermined corrective actions based on the category of the feedback data determined the plurality of processors carrying out the categorizing step; and
dynamically and automatically modifying the current outgoing email messaging campaign which has yet to be broadcast using the corrective action chosen by the plurality of processors in the selecting step;
wherein:
the plurality of categories comprises:
a hard bounce, indicating an incorrect e-mail address; or
a soft bounce, indicating any other reason why the email has not been delivered despite it having the correct email address;
the categorizing step further comprises categorizing the feedback data into one of a plurality of sub-categories specifically identifying the cause of the non-delivery of the email;
and the method further comprises:
determining whether the bounce error for a particular email address falls into a soft-bounce logical sub-category if the categorizing step categorizes the delivery error as a soft bounce;
checking whether there is a record of the particular email address having any bounces recorded against it from previous e-mail messaging campaigns;
establishing a hard-bounce quota value and comparing a current value of a hard-bounces counter for this email address against the hard-bounce quota value; and
recording the soft bounce as a hard-bounce error in a data store and continuing to allow emails to be sent to the email address if the current value of the hard-bounces counter equals the hard-bounce quota value.

* * * * *